(12) United States Patent
North Morris

(10) Patent No.: US 7,042,579 B2
(45) Date of Patent: May 9, 2006

(54) LASER MONITORING USING BOTH THE REFLECTED AND TRANSMITTED INTERFERENCE PATTERNS OF AN ETALON

(75) Inventor: Michael B. North Morris, Tucson, AZ (US)

(73) Assignee: Agilent Technologies, Inc., Palo Alto, CA (US)

( * ) Notice: Subject to any disclaimer, the term of this patent is extended or adjusted under 35 U.S.C. 154(b) by 260 days.

(21) Appl. No.: 10/668,499

(22) Filed: Sep. 23, 2003

(65) Prior Publication Data

US 2005/0062976 A1   Mar. 24, 2005

(51) Int. Cl.
*G01B 9/02* (2006.01)

(52) U.S. Cl. ...................................... 356/519; 356/454

(58) Field of Classification Search ................ 356/450, 356/454, 519
See application file for complete search history.

(56) References Cited

U.S. PATENT DOCUMENTS

| | | | |
|---|---|---|---|
| 6,259,712 B1 * | 7/2001 | DeCain et al. ................. | 372/32 |
| 6,421,120 B1 | 7/2002 | Wildnauer | |
| 6,714,309 B1 * | 3/2004 | May ........................... | 356/519 |
| 6,885,462 B1 * | 4/2005 | Lee et al. .................... | 356/519 |

* cited by examiner

*Primary Examiner*—Gregory J. Toatley, Jr.
*Assistant Examiner*—Michael A. Lyons

(57) ABSTRACT

A laser signal is monitored. The laser signal is forwarded to an etalon. Light transmitted through the etalon is detected. Light reflected from the etalon is detected. A ratio is calculated from the detected light transmitted through the etalon and the light reflected from the etalon.

20 Claims, 4 Drawing Sheets

LASER MONITORING USING BOTH THE REFLECTED AND TRANSMITTED INTERFERENCE PATTERNS OF AN ETALON

BACKGROUND

The present invention concerns signal test and measurement and pertains particularly to laser monitoring using both the reflected and transmitted interference patterns of an etalon.

When using devices that measure the wavelength or frequency of optical signals, such as optical spectrum analyzers or wavelength meters, calibration is important to insure accurate measurements are taken. When performing calibration, calibration references are used to provide a set of accurate, known frequencies or wavelengths.

Fabry-Perot Etalons have been used as a calibration reference in order to provide discreet reference points over a longer range of wavelengths than is typically available when using a gas absorption cell. See, for example, U.S. Pat. No. 6,421,120 B1 issued on Jul. 16, 2002 to Kenneth R. Wildnauer for EXTENDED WAVELENGTH CALIBRATION REFERENCE.

SUMMARY OF THE INVENTION

In accordance with an embodiment of the present invention, a laser signal is monitored. The laser signal is forwarded to an etalon. Light transmitted through the etalon is detected. Light reflected from the etalon is detected. A ratio is calculated from the detected light transmitted through the etalon and the light reflected from the etalon.

DETAILED DESCRIPTION OF EMBODIMENTS OF THE INVENTION

Figure 1:
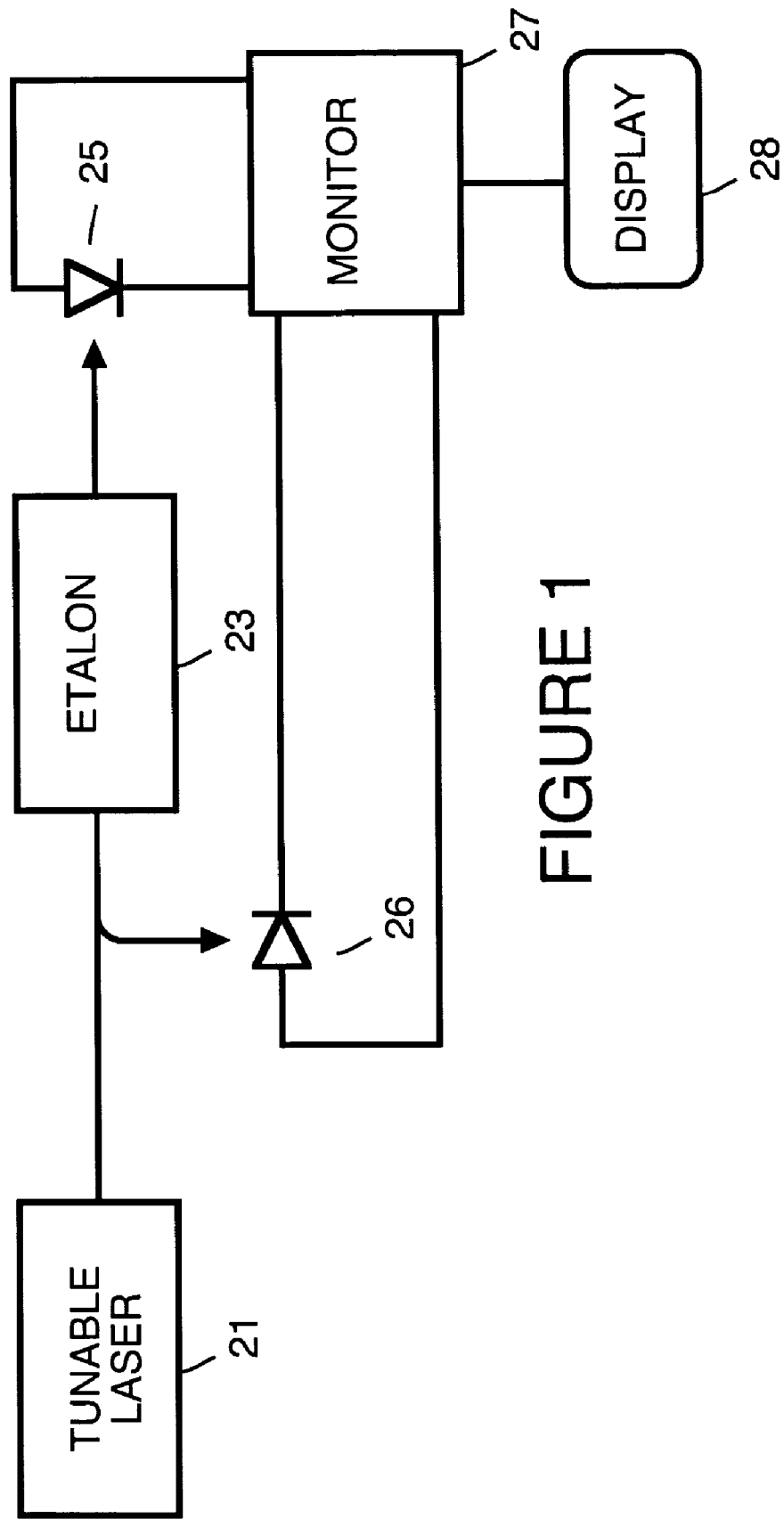
FIG. 1 is a block diagram illustrating laser wavelength monitoring using both the reflected and transmitted interference patterns of an etalon in accordance with an embodiment of the present invention.

FIG. 1 shows an etalon 23 being used to monitor a tunable laser 21. For example, etalon 23 is a Fabry-Perot etalon. A Fabry-Perot etalon includes two reflective surfaces with a transmission medium between the two reflective surfaces. A detector 25 detects light transmitted through etalon 23. A detector 26 detects light reflected from etalon 23.

When etalon 23 is a low finesse Fabry-Perot etalon, the light detected by detector 25 and by detector 26 can look very much like a sine wave but with poor fringe contrast. When etalon 23 is a high finesse Fabry-Perot etalon, the light detected by detector 25 and by detector 26 can have very sharp peaks or dips that provide discreet points for reference.

A monitor 27 uses a ratio of the reflected light detected by detector 26 and the transmitted light detected by detector 26 to track the wavelength of tunable laser 21. The transmission peaks of etalon 23 become taller and more narrow when the transmitted signal detected by detector 25 is divided by the reflected signals detected by detector 26. The sharpened peaks can be used to lock or compare etalon 23 with another reference to provide absolute wavelength measurements.

Dividing the reflected signal detected by detector 26 by the transmitted signal detected by detector 25 generates a sinusoidal signal that is ideal for tracking the relative wavelength of tunable laser 21. The sinusoidal signal provides good contrast for interpolating between peaks.

While etalon 23 can be a high finesse Fabry-Perot etalon or another type of etalon, there are advantages to using a low finesse Fabry-Perot. For example, low finesse Fabry-Perot etalons are generally less expensive than high finesse Fabry-Perot etalons since low finesse Fabry-Perot etalons are easier to align, generally require only one cavity and do not require extremely high reflectivity coatings.

The transmitted signal ($P_t[\lambda]$) detected by detector 25 can be described as set out by Equation 1 below:

$$P_t[\lambda] = \frac{T}{1 + F\mathrm{Sin}^2\left[\frac{2\pi nd\mathrm{Cos}(\theta)}{\lambda}\right]} \qquad \text{Equation 1}$$

In Equation 1, $P_t[\lambda]$ represents detected power, T represents transmittance, F is the coefficient of finesse, n is the index of refraction inside the cavity of etalon 23, d is the cavity length, θ is the angle at which the incident beam passes through the cavity and λ is the wavelength.

The reflected signal ($P_r[\lambda]$) detected by detector 26 can be described as set out by Equation 2 below:

$$P_r[\lambda] = \frac{RF\mathrm{Sin}^2\left[\frac{2\pi nd\mathrm{Cos}(\theta)}{\lambda}\right]}{1 + F\mathrm{Sin}^2\left[\frac{2\pi nd\mathrm{Cos}(\theta)}{\lambda}\right]} \qquad \text{Equation 2}$$

In Equation 2, $P_r[\lambda]$ represents detected power, R represents reflectance, F is the coefficient of finesse, n is the index of refraction inside the cavity of etalon 23, d is the cavity length, θ is the angle at which the incident beam passes through the cavity and λ is the wavelength.

Monitor 27 uses the ratio formed when the transmitted signal detected by detector 25 is divided by the reflected signals detected by detector 26 to lock or compare etalon 23 with another reference to provide absolute wavelength measurements. This ratio is shown in Equation 3 below:

$$\frac{P_t[\lambda]}{P_r[\lambda]} = \frac{T}{R} \frac{1}{F\mathrm{Sin}^2\left[\frac{2\pi nd\mathrm{Cos}(\theta)}{\lambda}\right]} \qquad \text{Equation 3}$$

Figure 2:
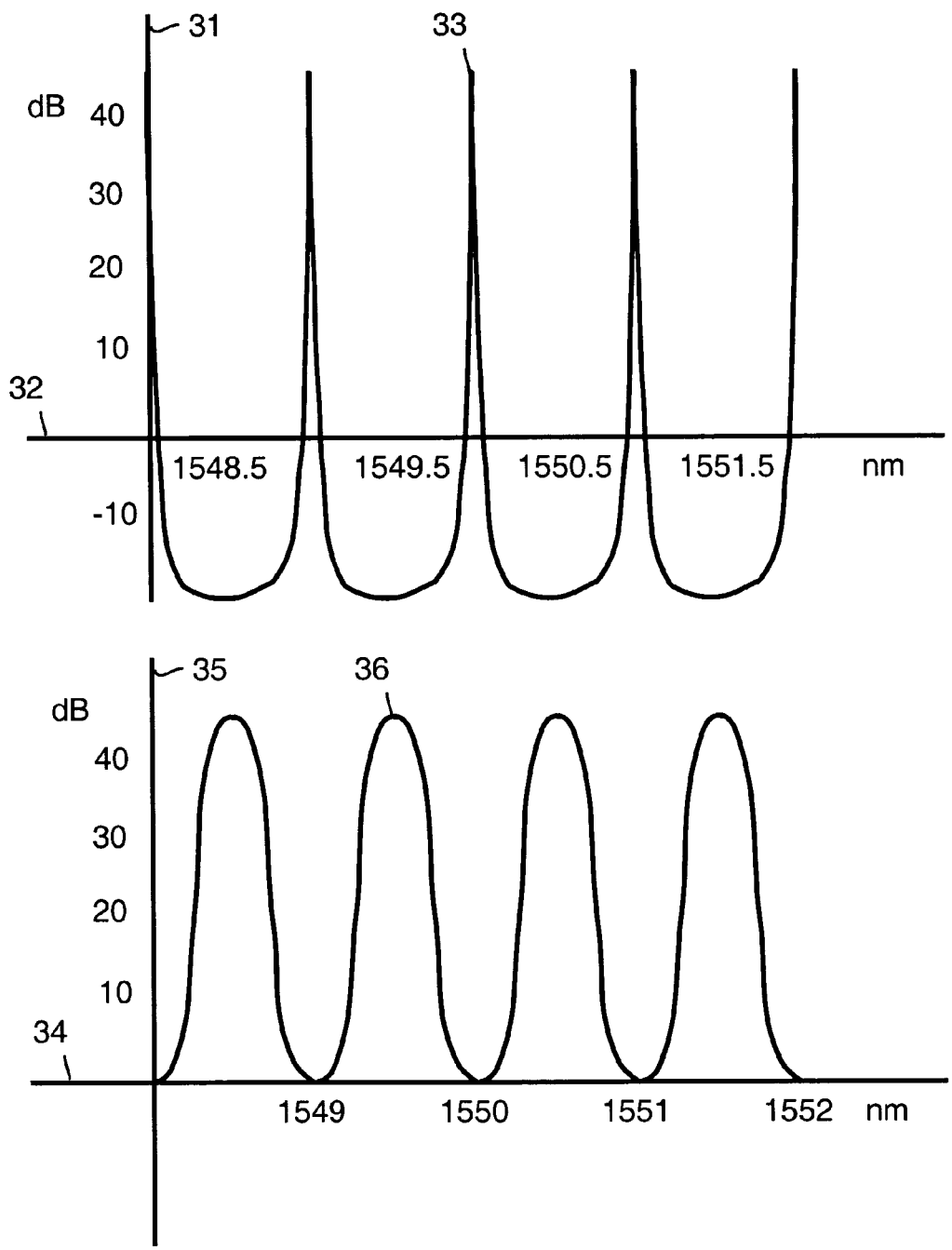
FIG. 2 shows example plots of signal ratios for reflected and transmitted interference patterns of an etalon during laser wavelength monitoring in accordance with an embodiment of the present invention.

In FIG. 2, waveform 33 gives an example plot of the ratio of Equation 3 where x-axis 32 represents wavelength in nanometers (nm) and y-axis 31 represents decibels (dB).

Monitor 27 uses the ratio formed when the reflected signals detected by detector 26 is divided by the transmitted signal detected by detector 25, for example, for interpolation when tracking the relative wavelength. This ratio is shown in Equation 4 below:

$$\frac{P_r[\lambda]}{P_t[\lambda]} = \frac{R}{T} F \mathrm{Sin}^2\left[\frac{2\pi n d \mathrm{Cos}(\theta)}{\lambda}\right]$$ Equation 4

In FIG. 2, waveform 36 is an example plot of the ratio of Equation 4 where x-axis 34 represents wavelength in nanometers (nm) and y-axis 35 represents decibels (dB). For example, waveform 36 can be displayed by monitor 27 on a display 28 (shown in FIG. 1).

Figure 3:
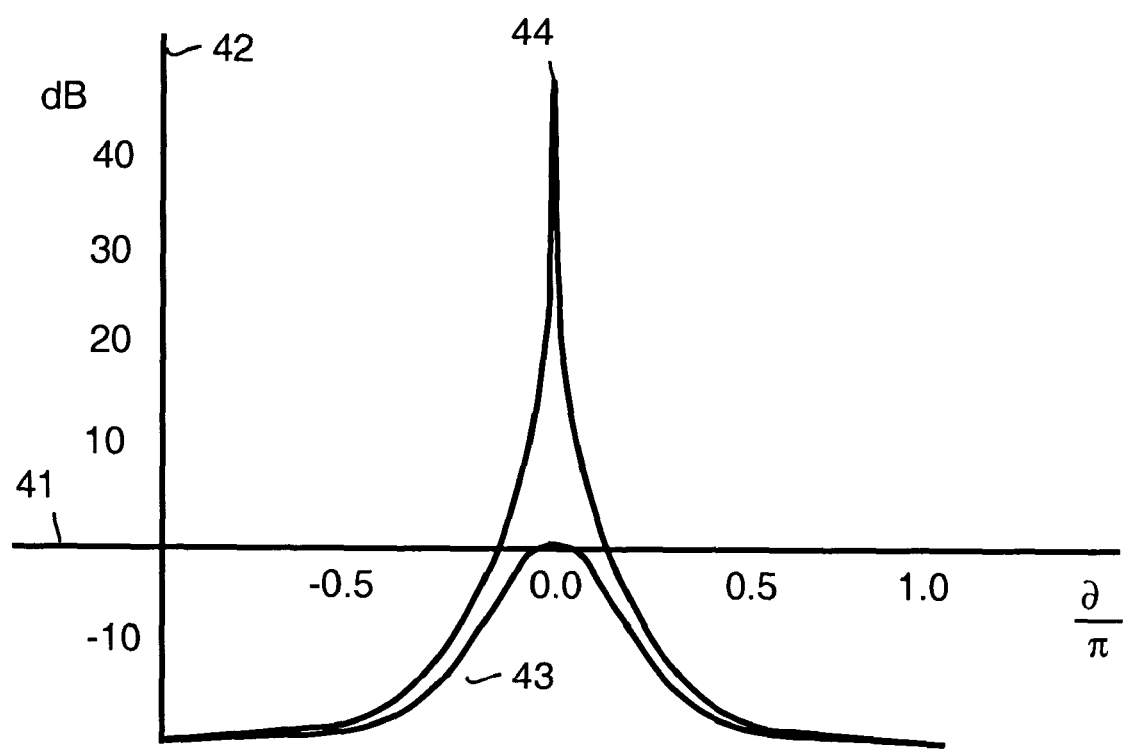
FIG. 3 shows an example plot of the improved dynamic range of the transmission peak when a ratio is used in accordance with an embodiment of the present invention.
Figure 4:
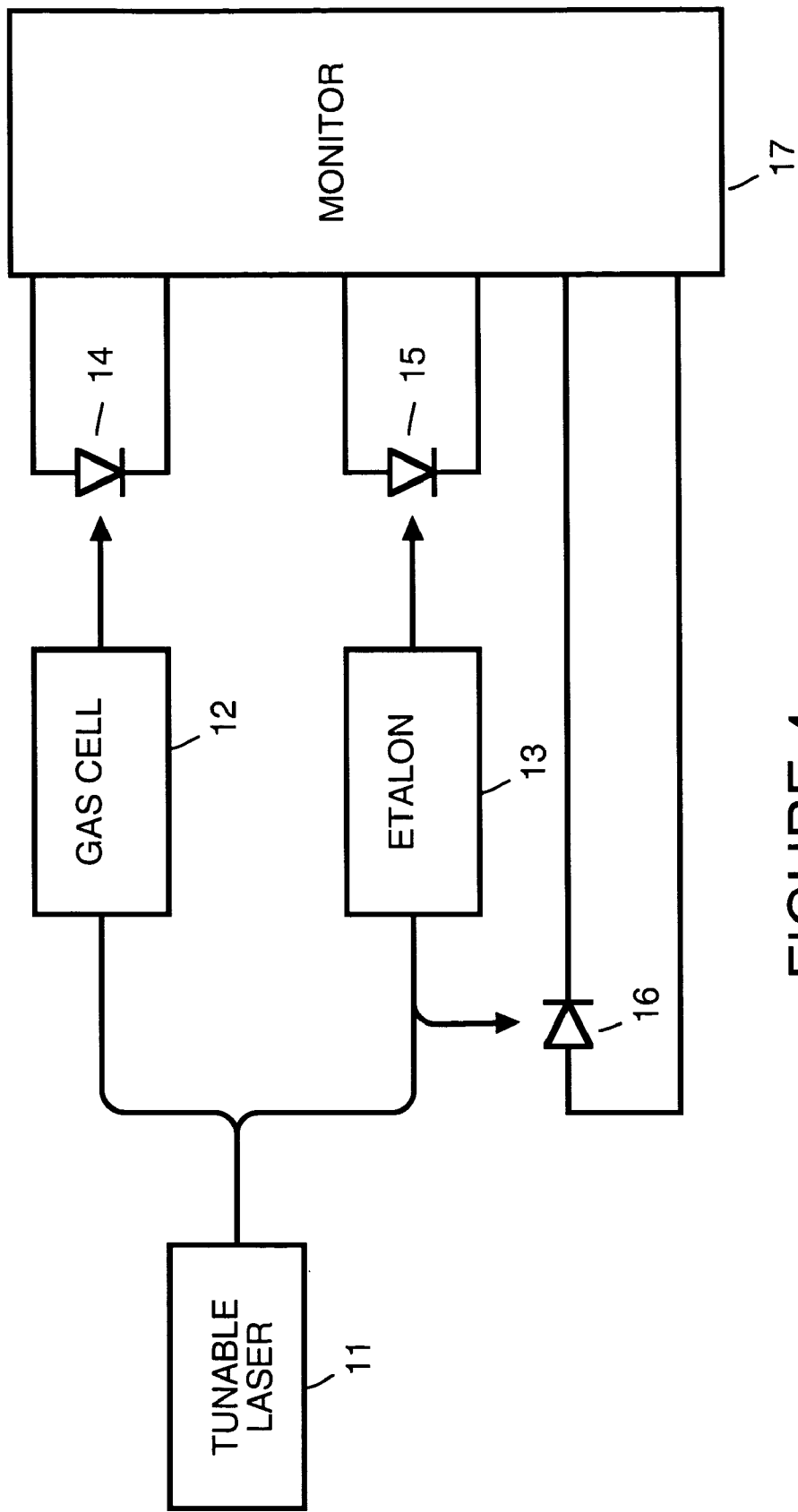
FIG. 4 is a block diagram illustrating laser wavelength monitoring using both the reflected and transmitted interference patterns of an etalon in accordance with another embodiment of the present invention.

FIG. 3 shows an example plot of the improved dynamic range of the transmission peak when a ratio is used. The plot represents the case where finesse (F) equals ten and the reflectance (R) equals the transmittance (T). In FIG. 4, waveform 44 represents the ratio $P_t/P_r$. Waveform 43 represents Pt. X-axis 41 represents $\partial/\pi$. Y-axis 35 represents decibels (dB).

The sharpened peaks can be used to lock or compare an etalon with another reference to provide absolute wavelength measurements. This is illustrated by FIG. 4. FIG. 4 shows an etalon 13 being used to monitor a tunable laser 11. For example, etalon 13 is a Fabry-Perot etalon. A detector 15 detects light transmitted through etalon 13. A detector 16 detects light reflected from etalon 13. A detector 14 detects light through gas absorption cell 12. Gas absorption cell 12 provides absorption lines in a particular part of the spectrum, overlapping at least a portion of the periodic response of etalon 13. For example gas absorption cell 12 is filled with acetylene, methane, hydrogen cyanide, carbon monoxide, hydrogen iodide, or water vapor. Gas absorption cell 12 acts as a reference to provide absolute wavelength measurements.

A monitor 17 uses a ratio of the reflected light detected by detector 16 and the transmitted light detected by detector 16 to track the wavelength of tunable laser 11. The transmission peaks of etalon 13 become taller and more narrow when the transmitted signal detected by detector 15 is divided by the reflected signals detected by detector 16. The sharpened peaks can be used to lock or compare etalon 13 with the signal detected by detector 14.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

What is claimed is:

1. A method for monitoring a laser signal comprising:
   (a) forwarding the laser signal to an etalon;
   (b) detecting light transmitted through the etalon to produce a transmitted signal;
   (c) detecting light reflected from the etalon to produce a reflected signal; and,
   (d) sharpening peaks of the transmitted signal by dividing the transmitted signal by the reflected signal.

2. A method as in claim 1 wherein in (d) the ratio is represented below:

$$\frac{P_t[\lambda]}{P_r[\lambda]} = \frac{T}{R} \frac{1}{F \mathrm{Sin}^2\left[\frac{2\pi n d \mathrm{Cos}(\theta)}{\lambda}\right]}$$

where $P_t[\lambda]$ represents detected power of the light transmitted through the etalon, $P_r[\lambda]$ represents detected power of the light reflected from the etalon, T represents transmittance of the etalon, R represents reflectance of the etalon, F is a coefficient of finesse of the etalon, n is an index of refraction inside a cavity of the etalon, d is a cavity length, $\theta$ is an angle at which an incident beam passes through the cavity, and $\lambda$ is a wavelength of the laser signal.

3. A method as in claim 1 wherein the etalon is a Fabry-Perot etalon.

4. A system that monitors a laser signal, the system comprising:
   an etalon that receives the laser signal;
   a first detector that detects light transmitted through the etalon to produce a transmitted signal;
   a second detector that detects light reflected from the etalon to produce a reflected signal; and,
   a monitor that sharpens peaks of the transmitted signal by dividing the transmitted signal by the reflected signal.

5. A system as in claim 4 wherein the ratio is represented below:

$$\frac{P_t[\lambda]}{P_r[\lambda]} = \frac{T}{R} \frac{1}{F \mathrm{Sin}^2\left[\frac{2\pi n d \mathrm{Cos}(\theta)}{\lambda}\right]}$$

where $P_t[\lambda]$ represents detected power of the light transmitted through the etalon, $P_r[\lambda]$ represents detected power of the light reflected from the etalon, T represents transmittance of the etalon, R represents reflectance of the etalon, F is a coefficient of finesse of the etalon, n is an index of refraction inside a cavity of the etalon, d is a cavity length, $\theta$ is an angle at which an incident beam passes through the cavity, and $\lambda$ is a wavelength of the laser signal.

6. A system as in claim 4 wherein the etalon is a Fabry-Perot etalon.

7. A system as in claim 4 wherein the system additionally comprises:
   a reference device that receives the laser signal; and,
   a detector that detects light transmitted through the reference device.

8. A system as in claim 7 wherein the reference device is a gas cell.

9. A system as in claim 7 wherein the monitor uses a ratio equal to power of the light transmitted through the etalon divided by power of the light reflected from the etalon to compare the etalon with the reference device.

10. A system as in claim 7 wherein the monitor uses a ratio equal to power of the light transmitted through the etalon divided by power of the light reflected from the etalon to compare the etalon with the reference device and the monitor uses a ratio equal to power of the light reflected from the etalon divided by power of the light transmitted through the etalon to interpolate between peaks.

11. A system that monitors a laser signal, the system comprising:
- a measurement means for receiving the laser signal;
- a first detection means for detecting light transmitted through the measurement means to produce a transmitted signal;
- a second detector means for detecting light reflected from the measurement means to produce a reflected signal; and,
- a device means for sharpening peaks of the transmitted signal by dividing the transmitted signal by the reflected signal.

12. A system as in claim 11 wherein in the ratio is equal to power of the light transmitted through the measurement means divided by power of the light reflected from the measurement means.

13. A system as in claim 11 wherein the system additionally comprises:
- reference means for receiving the laser signal; and,
- a third detector means for detecting light transmitted through the reference device.

14. A method for monitoring a laser signal comprising:
(a) forwarding the laser signal to an etalon;
(b) detecting light transmitted through the etalon to produce a transmitted signal;
(c) detecting light reflected from the etalon to produce a reflected signal; and,
(d) generating a sinusoidal signal for use in interpolation, the sinusoidal signal being generated by dividing the reflected signal by the transmitted signal.

15. A method as in claim 14 wherein in (d) the ratio is represented below:

$$\frac{P_r[\lambda]}{P_t[\lambda]} = \frac{R}{T} F \mathrm{Sin}^2\left[\frac{2\pi n d \mathrm{Cos}(\theta)}{\lambda}\right]$$

where $P_t[\lambda]$ represents detected power of the light transmitted through the etalon, $P_r[\lambda]$ represents detected power of the light reflected from the etalon, T represents transmittance of the etalon, R represents reflectance of the etalon, F is a coefficient of finesse of the etalon, n is an index of refraction inside a cavity of the etalon, d is a cavity length, $\theta$ is an angle at which an incident beam passes through the cavity, and $\lambda$ is a wavelength of the laser signal.

16. A system that monitors a laser signal, the system comprising:
- an etalon that receives the laser signal;
- a first detector that detects light transmitted through the etalon to produce a transmitted signal;
- a second detector that detects light reflected from the etalon to produce a reflected signal; and,
- a monitor that generates a sinusoidal signal for use in interpolation, the sinusoidal signal being generated by dividing the reflected signal by the transmitted signal.

17. A system as in claim 16 wherein the ratio is represented below:

$$\frac{P_r[\lambda]}{P_t[\lambda]} = \frac{R}{T} F \mathrm{Sin}^2\left[\frac{2\pi n d \mathrm{Cos}(\theta)}{\lambda}\right]$$

where $P_t[\lambda]$ represents detected power of the light transmitted through the etalon, $P_r[\lambda]$ represents detected power of the light reflected from the etalon, T represents transmittance of the etalon, R represents reflectance of the etalon, F is a coefficient of finesse of the etalon, n is an index of refraction inside a cavity of the etalon, d is a cavity length, $\theta$ is an angle at which an incident beam passes through the cavity, and $\lambda$ is a wavelength of the laser signal.

18. A system as in claim 16 wherein the system additionally comprises:
- a reference device that receives the laser signal; and,
- a detector that detects light transmitted through the reference device.

19. A system as in claim 18 wherein the monitor uses a ratio equal to power of the light through the etalon divided by power of the light reflected from the etalon to compare the etalon with the reference device.

20. A system as in claim 18 wherein the monitor uses a ratio equal to power of the light transmitted through the etalon divided by power of the light reflected from the etalon to compare the etalon with the reference device and the monitor uses a ratio equal to power of the light reflected from the etalon divided by power of the light transmitted through the etalon to interpolate between peaks.

* * * * *